Aug. 17, 1926.
W. B. WESCOTT
TRIPOD
Original Filed June 28, 1917
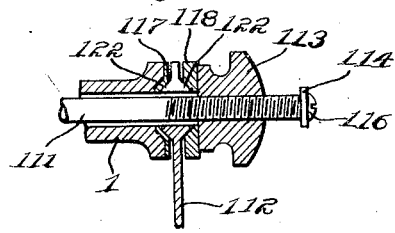
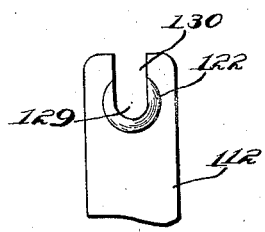
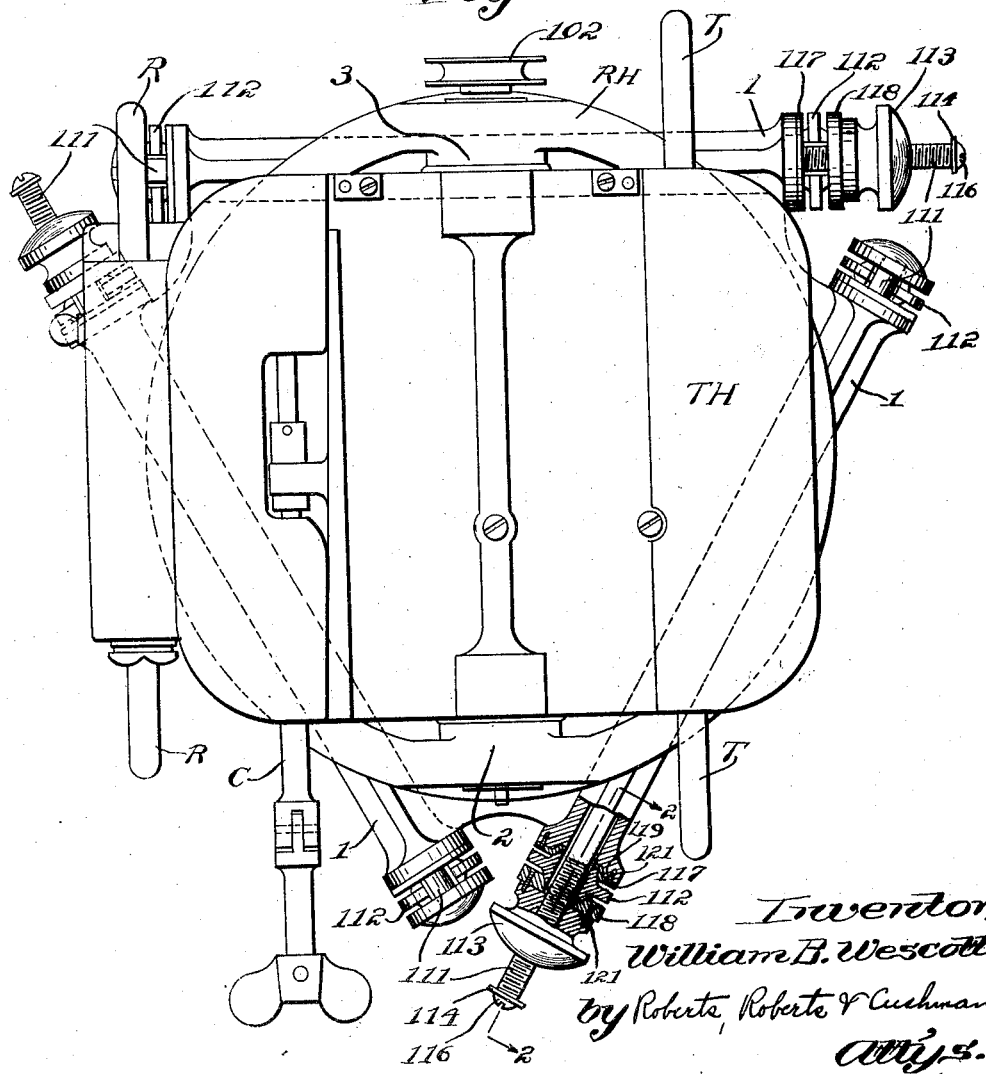
Inventor,
William B. Wescott,
by Roberts, Roberts & Cushman
Attys.

Patented Aug. 17, 1926.

1,596,644

UNITED STATES PATENT OFFICE.

WILLIAM B. WESCOTT, OF QUINCY, MASSACHUSETTS, ASSIGNOR TO KALMUS, COMSTOCK & WESCOTT, INC., OF BOSTON, MASSACHUSETTS, A CORPORATION OF MASSACHUSETTS.

TRIPOD.

Original application filed June 28, 1917, Serial No. 177,518. Divided and this application filed September 29, 1922. Serial No. 591,337.

This invention relates to adjustable and demountable supports for cameras, surveying instruments and the like of the type known as tripods, this being a division of my copending application, Serial No. 177,-518, filed June 28, 1917. The objects of the invention are to provide rigid and convenient adjustable means for supporting various instruments and apparatus to permit the rapid demounting of the device but without the liability of the separation of the parts thereof when the device is merely being adjusted, and in general to improve and simplify devices of the class described and to render them more efficient and satisfactory in service.

The invention comprises the combination of two supporting members adjustably secured together, the one having an opening, the other a projection extending through the opening, and a member on the projection maintaining the two members in operative relationship, the member with the opening and one of the other members having telescoping parts.

The invention further comprises a tripod comprising a head, a leg for supporting the head, and a member on the head passing through an opening in the leg and provided on its outer end with means retaining the leg in position relative to the head, and interfitting parts on the leg and head to permit angular adjustment thereof. The leg may have a slot extending to the opening therein to permit the attaching and detaching of the leg on and from the member on the head by movement of the leg transversely or radially of the member.

The invention is illustrated in the accompanying drawing, in which:

Fig. 1 is a plan view of a tripod head embodying the features of the invention with one of the connections of a leg with the head shown in horizontal section;

Fig. 2 is a sectional view on the line 2—2 of Fig. 1; and

Fig. 3 is an elevational view of the upper end of a tripod leg.

The embodiment of the invention chosen for the purpose of illustration comprises apparatus adapted to support a motion picture camera and includes a stationary head (not shown) adapted to be suitably supported, as for example by means of tripod legs the bifurcated ends of which are shown in Fig. 1 attached to the head at opposite ends of the three hollow bearings 1 integrally secured to the bottom of the stationary head and arranged in triangular form; a rotating head RH mounted on the stationary head so as to rotate horizontally; and a tilting head TH mounted in standards 2 and 3 disposed at opposite sides of the rotating head RH, the tilting head TH being so mounted on the rotating head RH as to be tilted about a horizontal axis. The camera, or other apparatus, is either rigidly or adjustably mounted on the tilting head TH and may be power driven by a suitable connection to a pulley 102. Shaft C is operable to clamp the camera in place in the manner disclosed in my copending application above identified. The head RH is rotated by a suitable crank (not shown) keyed on shaft R and head TH is tilted by rotating shaft T by means of a suitable handle (not shown).

The preferred manner of attaching the tripod legs to the tripod head is illustrated in Figs. 1 and 2. The bearings 1 have longitudinal openings therethrough adapted to receive shafts 111 headed at one end, these shafts extending from the ends of the bearings 1 through openings 129 in the upper ends 112 of the tripod legs, the legs being held in position on the shafts 111 by means of wing-nuts 113 threaded on the outer ends of the shafts 111, a washer 114 being secured to the outer end of each shaft by screws 116 to prevent the accidental removal of the wing-nuts 113. Inasmuch as the bearings 1 and the wing-nuts 113 are preferably made of cast material, bearing plates 117 and 118 are preferably provided between the tripod legs 112 and the bearings 1 and wing-nuts or headed shaft ends respectively, the bearing plates 117 and 118 being secured in place by means of screws 119 threaded into openings 121 as illustrated in Fig. 1.

Spherical enlargements 122 are provided on opposite sides of the ends 112 of the tripod legs surrounding the openings 129 for the shafts 111, these spherical enlargements fitting into spherical recesses or concavities in the bearing plates 117 and 118. Extending between the shaft openings 129 and the upper ends of each of the tripod legs is a slot 130 (Fig. 3) so that the tripod legs can be removed from or attached to the shafts 111 without removing the wing-nuts from the shafts.

An important advantage afforded by the described ball and socket type of bearing is that, by virtue of the axial telescoping portions of the bearing, the tripod legs may readily be maintained in position on the shafts 111 without clamping them very tightly against the bearings 1 by means of the wing-nuts 113 so that they are readily adjusted about the axes of the shafts 111 without any liability of the legs dropping away from the tripod head. To detach the tripod legs when the tripod is to be taken apart it is only necessary to loosen wing-nuts 113 to a point adjacent washers 114 and then give a pull on the legs in a direction radial of shafts 111 to spring the enlagements 122 on the ends 112 of the legs out of the concavities in the bearing washers 117 and 118, the shafts 111 sliding out of the openings 129 in the leg ends through slots 130. The legs are as readily mounted on the head by reversing this procedure.

The spherical form of the enlargements 122 and of the cooperating recesses in the bearing plates 117 and 118 is likewise of importance in permitting the parts to readily adapt themselves to varied conditions of adjustment produced when the length of the tripod legs is changed thereby changing the angle between the bifurcated ends of the tripod legs and the shafts 111. Smoothness and ease of accommodation to adjustment about the shafts 111 as well as angularly relative thereto are possible only by the spherical form of the cooperating parts.

I claim:

Tripod apparatus comprising a head, a leg for supporting the head, said leg having a bifurcated end, a shaft on said head having a threaded end projecting through said bifurcation in the leg, a nut on the shaft to clamp the leg against the head, circular enlargements on said leg adjacent the bifurcation therein cooperating with complemental recesses in said nut and said head to prevent accidental separation of the leg from the head while permitting angular adjustment of the leg around the shaft.

Signed by me at Boston, Massachusetts, this twentieth day of September 1922.

WILLIAM B. WESCOTT.